US011890878B2

United States Patent
Nishio et al.

(10) Patent No.: US 11,890,878 B2
(45) Date of Patent: Feb. 6, 2024

(54) METHOD FOR GENERATING EJECTION POSITION DATA, DEVICE FOR GENERATING EJECTION POSITION DATA, AND PROGRAM

(71) Applicant: MIMAKI ENGINEERING CO., LTD., Nagano (JP)

(72) Inventors: Keita Nishio, Nagano (JP); Wataru Hioki, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 18/037,765

(22) PCT Filed: Nov. 19, 2021

(86) PCT No.: PCT/JP2021/042515
§ 371 (c)(1),
(2) Date: May 18, 2023

(87) PCT Pub. No.: WO2022/107870
PCT Pub. Date: May 27, 2022

(65) Prior Publication Data
US 2023/0415490 A1 Dec. 28, 2023

(30) Foreign Application Priority Data
Nov. 20, 2020 (JP) .................................. 2020-193165

(51) Int. Cl.
*B41J 2/21* (2006.01)
*G06K 15/02* (2006.01)
(Continued)

(52) U.S. Cl.
CPC .......... *B41J 2/2139* (2013.01); *G06K 15/002* (2013.01); *G06K 15/102* (2013.01);
(Continued)

(58) Field of Classification Search
USPC ........................................................ 358/3.02
See application file for complete search history.

(56) References Cited

U.S. PATENT DOCUMENTS

2008/0123117 A1* 5/2008 Kimura ................ B41J 2/04593
358/1.9

FOREIGN PATENT DOCUMENTS

| JP | 2007125826 | 5/2007 |
| JP | 2020110989 | 7/2020 |

OTHER PUBLICATIONS

"International Search Report (Form PCT/ISA/210) of PCT/JP2021/042515", dated Jan. 18, 2022, with English translation thereof, pp. 1-4.

* cited by examiner

*Primary Examiner* — Jacky X Zheng
(74) *Attorney, Agent, or Firm* — JCIPRNET (57) ABSTRACT

A method for generating ejection position data indicating an ejection position where ink is ejected includes performing an edge detection process, an edge correction process, and an ejection position data generation process based on processing target data indicating an image to be printed. In the processing target data, a non-ejection value indicating that ink is not ejected to a corresponding ejection position or an ejection value other than the non-ejection value is set as a pixel value of a pixel. In the edge detection process, a position where a pixel to which the non-ejection value is set and a pixel for which the ejection value is set are adjacent is detected to detect an edge. In the edge correction process, the pixel value of the corresponding pixel is changed to a non-ejection value for at least a part of the ejection position where ink is ejected to draw the edge.

9 Claims, 7 Drawing Sheets

(51) Int. Cl.
*G06K 15/00* (2006.01)
*G06T 7/13* (2017.01)
*G06K 15/10* (2006.01)
*G06T 7/11* (2017.01)
*H04N 1/58* (2006.01)

(52) U.S. Cl.
CPC ......... *G06K 15/186* (2013.01); *G06K 15/188* (2013.01); *G06K 15/1871* (2013.01); *G06T 7/11* (2017.01); *G06T 7/13* (2017.01); *H04N 1/58* (2013.01)

[Image] Thin line: vertical 2 pixels, horizontal 10 pixels

(b)

[Output result]

(c)

[Image] Outline character: 「—」

(d)

[Output result]

[Image] Thin line: vertical 2 pixels, horizontal 10 pixels

(b)

[Output result]

(c)

[Image] Outline character:「—」

(d)

[Output result]

METHOD FOR GENERATING EJECTION POSITION DATA, DEVICE FOR GENERATING EJECTION POSITION DATA, AND PROGRAM

CROSS-REFERENCE TO RELATED APPLICATION

This application is a 371 application of the International PCT application serial no. PCT/JP2021/042515, filed on Nov. 19, 2021, which claims the priority benefits of Japan Patent Application No. 2020-193165, filed on Nov. 20, 2020. The entirety of each of the above-mentioned patent applications is hereby incorporated by reference herein and made a part of this specification.

TECHNICAL FIELD

The present invention relates to a method for generating ejection position data, an ejection position data generation device, and a program.

BACKGROUND ART

Conventionally, an inkjet printer, which is a printing apparatus that performs printing through an inkjet method, has been widely used. When printing is performed by an inkjet printer, the printing apparatus ejects ink based on, for example, data generated by a raster image processor (RIP) process (see e.g., Patent Literature 1). In this case, based on this data, the inkjet printer executes printing on a medium (medium) to be printed by ejecting ink from an inkjet head to an ejection position set according to the resolution of printing. In the RIP process, data indicating an ejection position where ink is ejected from the inkjet printer is generated.

CITATION LIST

Patent Literature

Patent Literature 1: Japanese Unexamined Patent Publication No. 2020-110989

SUMMARY OF INVENTION

Technical Problems

The ink ejected from the inkjet head onto the medium usually spreads on the surface of the medium after landing on the medium. Furthermore, in this case, it is conceivable to set the size in which the ink spreads on the medium so as to generate a dot gain in which the ink dot spreads in a range wider than the range corresponding to one ejection position determined according to the resolution of printing in consideration of, for example, filling the medium as necessary.

However, in this case, the dot gain is generated in a region other than the region to be filled, and thus, it may be difficult to perform printing at a desired quality. More specifically, for example, it is conceivable that a dot gain is generated at a portion where a thin line (line) is drawn, so that the line is output thicker than the original intention. In addition, for example, it is also conceivable that a dot gain is generated at a portion where an outline character is drawn, so that an outlined portion is filled. Due to the occurrence of these phenomena, it becomes difficult to perform printing at a desired quality, and the quality of printing may be degraded.

Therefore, conventionally, there has been a case where printing with higher quality is desired. Therefore, the present invention provides a method for generating ejection position data, an ejection position data generation device, and a program that can solve the above problems.

Solutions to Problems

In order to solve the above problems, the inventor of the present application considered performing image processing of correcting an edge on an image to be printed by a printing apparatus. More specifically, as the image processing, consideration is made to change at least a part of the ejection position where ink is ejected from the inkjet head to draw the edge to, for example, a position where the ink is not ejected. According to such configuration, the manner the edge appears in the printing result can be appropriately changed. Furthermore, for example, it is possible to appropriately prevent the line from being output thicker than the original intention at the portion where the thin line is drawn, the portion where the outline character is drawn from being filled, and the like.

Through further thorough research, the inventor of the present application found features necessary for obtaining such effects and contrived the present invention. In order to solve the above problems, the present invention provides a method for generating ejection position data for generating ejection position data that is data indicating an ejection position where ink is ejected from an inkjet head in a printing apparatus, the method including an edge detection process of detecting an edge with respect to at least a part of an image based on processing target data that is image data indicating the image to be printed by the printing apparatus; an edge correction process of performing image processing of correcting the edge detected in the edge detection process on the image; and an ejection position data generation process of generating the ejection position data by reflecting a result of the image processing in the edge correction process; where the processing target data is data indicating the image configured by pixels associated with the ejection position, and in which a non-ejection value that is a value indicating that ink is not ejected to the corresponding ejection position or an ejection value that is a value other than the non-ejection value is set as a pixel value of each pixel; in the edge detection process, the edge is detected by detecting a position where a pixel to which the non-ejection value is set and a pixel to which the ejection value is set are adjacent to each other; and in the edge correction process, the image processing of correcting the edge by changing the pixel value of the corresponding pixel to the non-ejection value is performed for at least a part of the ejection position where ink is ejected from the inkjet head to draw the edge detected in the edge detection process.

According to such a configuration, the edge can be appropriately corrected. Thus, the quality of printing executed in the printing apparatus can be appropriately enhanced. More specifically, in the case of such a configuration, for example, it is possible to appropriately prevent the line from being output thicker than the original intention at the portion where the thin line is drawn, the portion where the outline character is drawn from being filled, and the like by correcting the edge.

In this configuration, the operation of correcting the edge can also be considered as an operation of adjusting pixels indicating an image to be printed, or the like. Furthermore, in this configuration, in the edge correction process, it is conceivable to set the pixel value of the pixel within a range of a predetermined width from the edge to the non-ejection value. More specifically, in this case, in the edge correction process, it is conceivable to perform image processing of changing the pixel value of the pixel that is within the range of the predetermined number of pixels from the boundary of the edge to be corrected and to which the ejection value is set as the pixel value to the non-ejection value. With this configuration, for example, the influence of the dot gain can be appropriately suppressed, and the edge can be sharpened.

Furthermore, in the edge correction process, for example, it is preferable to correct the edge so that the line does not disappear or the like due to the correction. More specifically, in the edge correction process, it is conceivable to perform image processing on an image so that for an edge generated in correspondence with a line having a preset line width or less among the edges detected in the edge detection process, the line does not disappear due to the edge correction. According to such a configuration, the edge can be more appropriately corrected.

Furthermore, in this configuration, it is conceivable to use a color printer that performs color printing using inks of a plurality of colors as the printing apparatus. In this case, it is conceivable to further perform image acquisition process, separation process, and the like in the operation of generating the ejection position data. The image acquisition process can be considered as a process of acquiring color image data that is data indicating a color image to be printed by the printing apparatus. Furthermore, the separation process can be considered as a process of generating a gray-scaled image corresponding to each color of the inks of a plurality of colors used in the printing apparatus, or the like. Furthermore, in the separation process, the color image is separated according to each color of the inks of a plurality of colors to generate a gray-scaled image corresponding to each color. Moreover, in this case, it is conceivable to use data indicating a gray-scaled image corresponding to each color as the processing target data. According to such configuration, the edge correction can be appropriately performed for every color of the ink used in the printing apparatus. Furthermore, the quality of the image to be printed can be more appropriately enhanced.

Furthermore, in this configuration, it is conceivable to perform edge detection and correction for the entire image indicated by the processing target data in the edge detection process and the edge correction process. Moreover, in the edge detection process and the edge correction process, it is also conceivable to perform edge detection and correction for only a part of the image indicated by the processing target data. In a case where edge detection or correction is performed for only a part of the image indicated by the processing target data, it is conceivable to use processing target data in a format in which one part in the image is selectable. More specifically, in this case, it is conceivable to use, as the processing target data, data in a format in which one part in the image is selectable as an object distinguished from other parts. Furthermore, in this case, in the edge detection process, an edge in the preselected object is detected. In addition, in the edge correction process, the edge correction is performed on the edge detected in the object. With this configuration, the edge correction meeting the intention of the user can be more appropriately performed. Furthermore, in this case, for example, it is conceivable to select an object corresponding to a portion where it is important to express a thin line, such as a portion expressing a character, and perform edge detection and correction.

Furthermore, in this case, it is conceivable to select an object using an auxiliary image that is an image including pixels to which an auxiliary value to be used for selecting an object is set. More specifically, in this case, in the edge detection process, it is conceivable to use auxiliary data indicating an auxiliary image in which an auxiliary value, which is a target value different from a value set to represent a color, is set for each pixel, to treat a portion including pixels corresponding to pixels to which a predetermined auxiliary value is set in the auxiliary image among the pixels of the image indicated by the processing target data as an object to be detected, and detect an edge in the object. With this configuration, the object can be easily and appropriately selected.

The auxiliary data can be considered as data indicating an image in which the auxiliary value is set to the pixel. As such auxiliary data, for example, it is conceivable to use a channel (alpha channel etc.) prepared separately from a color channel in data indicating a color image using a plurality of color channels corresponding to a plurality of colors.

For example, it is also conceivable to select an object according to a user's instruction received using, for example, an input device such as a mouse. In this case, it is conceivable to further perform a range selecting process of receiving an instruction to select a partial range in the image from the user. Furthermore, in the edge detection process, a part including pixels in the range selected by the user in the range selecting process among the pixels of the image indicated by the processing target data is treated as an object distinguished from other parts in the image, and an edge in the object is detected. With this configuration as well, the object can be easily and appropriately selected.

Furthermore, the features of the present invention can also be considered by focusing on performing the edge detection process and the edge correction process using the gray-scaled image generated by the separation process. Furthermore, in this case, the operation of the edge correction process can also be considered as an operation of performing image processing of correcting the edge to reduce the ink ejected to at least a part of the ejection position, to where the ink is ejected from the inkjet head to draw the edge detected in the edge detection process. Furthermore, as a configuration of the present invention, it is also conceivable to use an ejection position data generation device, a program, or the like having the same features as those described above. In this case as well, for example, effects similar to the above can be obtained.

Effect of the Invention

According to the present invention, the quality of printing executed in the printing apparatus can be appropriately enhanced.

BRIEF DESCRIPTION OF THE DRAWINGS

FIG. 3 is a diagram describing a reason for correcting an edge. (a) and (b) of FIG. 3 illustrate examples of data indicating a thin line and output results. (c) and (d) of FIG. 3 illustrate examples of data indicating thin outline characters and output results.

DESCRIPTION OF EMBODIMENTS

Figure 1:
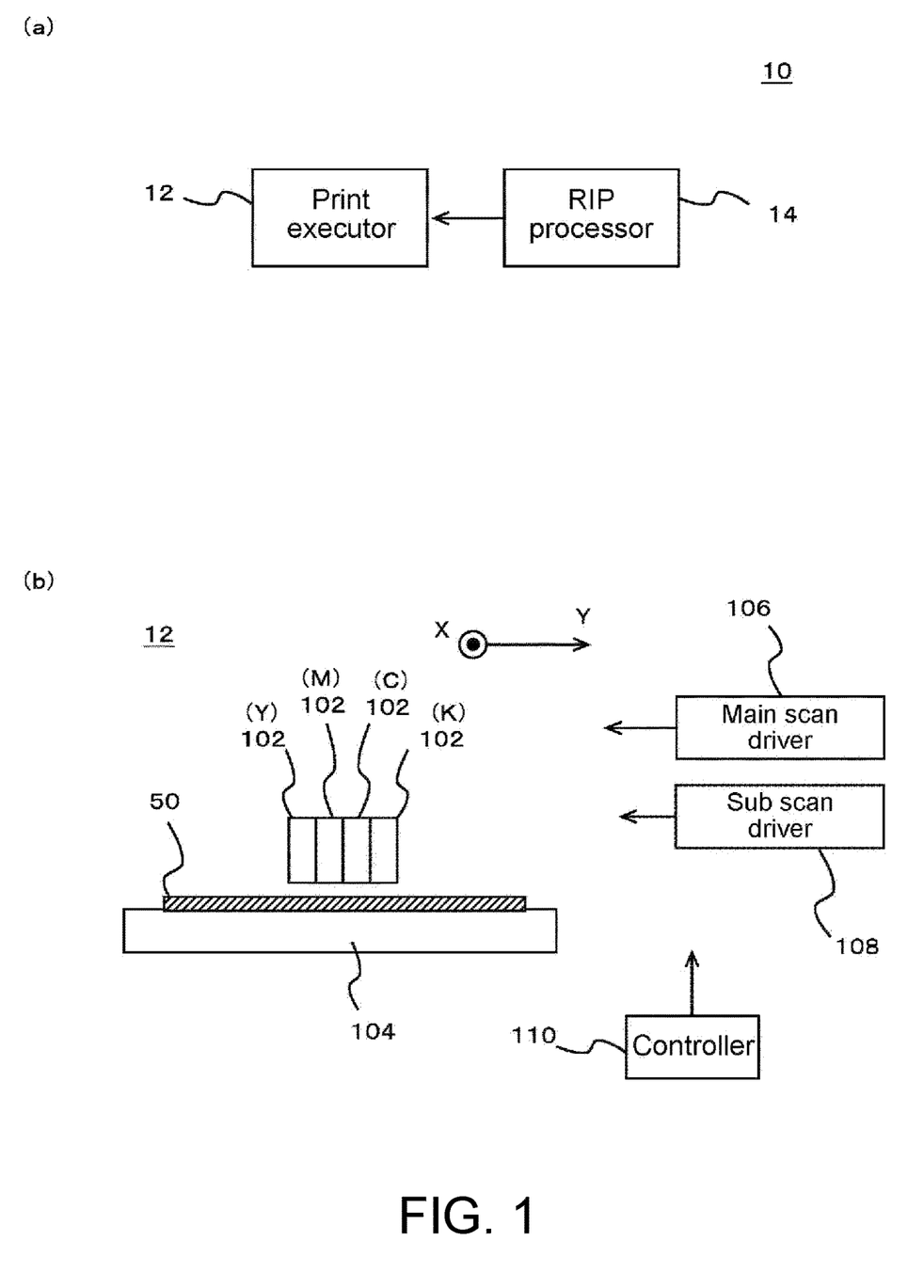
FIG. 1 is a diagram showing an example of a configuration of a printing system 10 according to one embodiment of the present invention. (a) of FIG. 1 shows an example of a configuration of the printing system 10. (b) of FIG. 1 shows an example of a configuration of a print executor 12 in the printing system 10.

Hereinafter, an embodiment according to the present invention will be described with reference to the drawings. FIG. 1 is a diagram showing an example of a configuration of a printing system 10 according to one embodiment of the present invention. (a) of FIG. 1 shows an example of a configuration of the printing system 10. (b) of FIG. 1 shows an example of a configuration of a print executor 12 in the printing system 10. Other than the points described below, the printing system 10 of the present example may have features same as or similar to the known printing systems.

In the present example, the printing system 10 is a system that performs printing on a medium (media) 50 to be printed through an inkjet method, and includes a print executor 12 and an RIP processor 14. The print executor 12 is an example of a printing apparatus, and is a part that executes a printing operation of ejecting ink onto the medium 50. The print executor 12 can also be considered as a main body portion of an inkjet printer, or the like. Furthermore, in the present example, the print executor 12 receives RIP generation data, which is an example of ejection position data, from the RIP processor 14, and ejects ink according to the RIP generation data to execute the printing operation on the medium 50. In this case, the ejection position data can be considered as data indicating an ejection position at where the ink is ejected from the inkjet head in the printing apparatus, and the like. Furthermore, the RIP generation data can be considered as data generated by performing raster image processor (RIP) processing, and the like.

Furthermore, in the present example, the print executor 12 is a color printer that performs color printing using inks of a plurality of colors different from each other, and includes a plurality of inkjet heads 102, a platen 104, a main scan driver 106, a sub scan driver 108, and a controller 110. Each of the plurality of inkjet heads 102 is an ejection head that ejects ink by an inkjet method, and ejects ink of each color used for printing. In this case, it is conceivable to eject ink of different colors from each other by each of the plurality of inkjet heads 102. More specifically, in the present example, each of the plurality of inkjet heads 102 ejects ink of each color of process colors, which are basic colors in color printing. As the ink of each color of the process color, for example, it is conceivable to use ink of each color of yellow (Y color), magenta (M color), cyan (C color), and black (K color). Furthermore, each inkjet head 102 includes a nozzle row in which a plurality of nozzles are arranged in a predetermined nozzle row direction, and ejects ink from each nozzle in the nozzle row. In the present example, the nozzle row direction is a direction parallel to a sub scanning direction (X direction in the figure) set in advance in the print executor 12. In this case, in each inkjet head 102, the plurality of nozzles are lined in the nozzle row direction so that the positions in the sub scanning direction are shifted from each other.

Note that, in the present example, each of the plurality of inkjet heads 102 is an inkjet head that ejects only droplets (ink droplets) of one type of volume. In this case, ejecting only the droplets of one type of volume can be considered that the design volume of the ink droplets ejected from each nozzle of the inkjet head is one type, and the like. Furthermore, ejecting only the droplets of one type of volume can be considered as controlling the ejection of ink from each nozzle in two types of states of whether or not to eject ink, or the like. Furthermore, in the present example, the volume of the droplets ejected from each nozzle of the inkjet head is a volume in which the ink dot spreads in a range wider than one dot range determined according to the resolution of printing. In a modified example of the configuration of the print executor 12, for example, it is conceivable to use an inkjet head that ejects droplets of a plurality of types of volumes as each inkjet head 102. In this case, the inkjet head that ejects the droplets of a plurality of types of volumes can also be considered as a multi-valued head or the like in which the volume of the droplet can be set in a plurality of stages.

The platen 104 is a table-shaped member in which the medium 50 is placed on the upper surface, and holds the medium 50 in a state of facing the plurality of inkjet heads 102. The main scan driver 106 is a driver that causes the plurality of inkjet heads 102 to perform the main scan. In this case, the main scan can be considered as an operation of ejecting ink while relatively moving with respect to the medium 50 in a main scanning direction set in advance, or the like. Furthermore, in the present example, the main scanning direction is a direction (Y direction in the figure) orthogonal to the sub scanning direction. At the time of the main scan, the main scan driver 106 causes each nozzle in each of the plurality of inkjet heads 102 to eject ink to an ejection position set according to the resolution of printing in response to the control of the controller 110. In this case, causing the inkjet head 102 to eject ink to the ejection position can be considered as ejecting ink to the ejection position specified by the RIP generation data among the ejection positions set according to the resolution of printing, or the like. The sub scan driver 108 is a driver that causes the plurality of inkjet heads 102 to perform the sub scan. The sub scan can be considered as an operation of relatively moving in the sub scanning direction with respect to the medium 50, or the like. The sub scan can also be considered as an operation of relatively feeding the medium 50 in the sub scanning direction with respect to the plurality of inkjet heads 102 between the main scans, or the like.

The controller 110 is, for example, a portion including a CPU and the like in the print executor 12, and controls the operation of each unit of the print executor 12. In the present example, the controller 110 controls the operation of each unit of the print executor 12 based on the RIP generation data received from the RIP processor 14. The controller 110 thus causes the print executor 12 to execute the printing operation.

The RIP processor 14 is an example of an ejection data generator, and generates RIP generation data by performing RIP processing based on input data indicating an image to be printed by the print executor 12. Then, the RIP processor 14 provides the generated RIP generation data to the print executor 12 to control the operation of the print executor 12. In this case, the RIP processor 14 generates RIP generation data by performing RIP processing in accordance with, for example, the configuration of the print executor 12, the setting of the printing operation executed in the print executor 12, and the like. More specifically, in the present example, the RIP processor 14 generates, as RIP generation data, data indicating at least a position where ink is to be ejected in a plurality of ejection positions set according to the resolution of printing.

As the RIP processor 14, for example, a computer or the like that executes a program (software) for RIP processing can be suitably used. Furthermore, the RIP processor 14 can also be considered as, for example, a computer or the like that controls the operation of the print executor 12. The operation of generating the RIP generation data in the RIP processor 14 will be described in more detail below.

Figure 2:
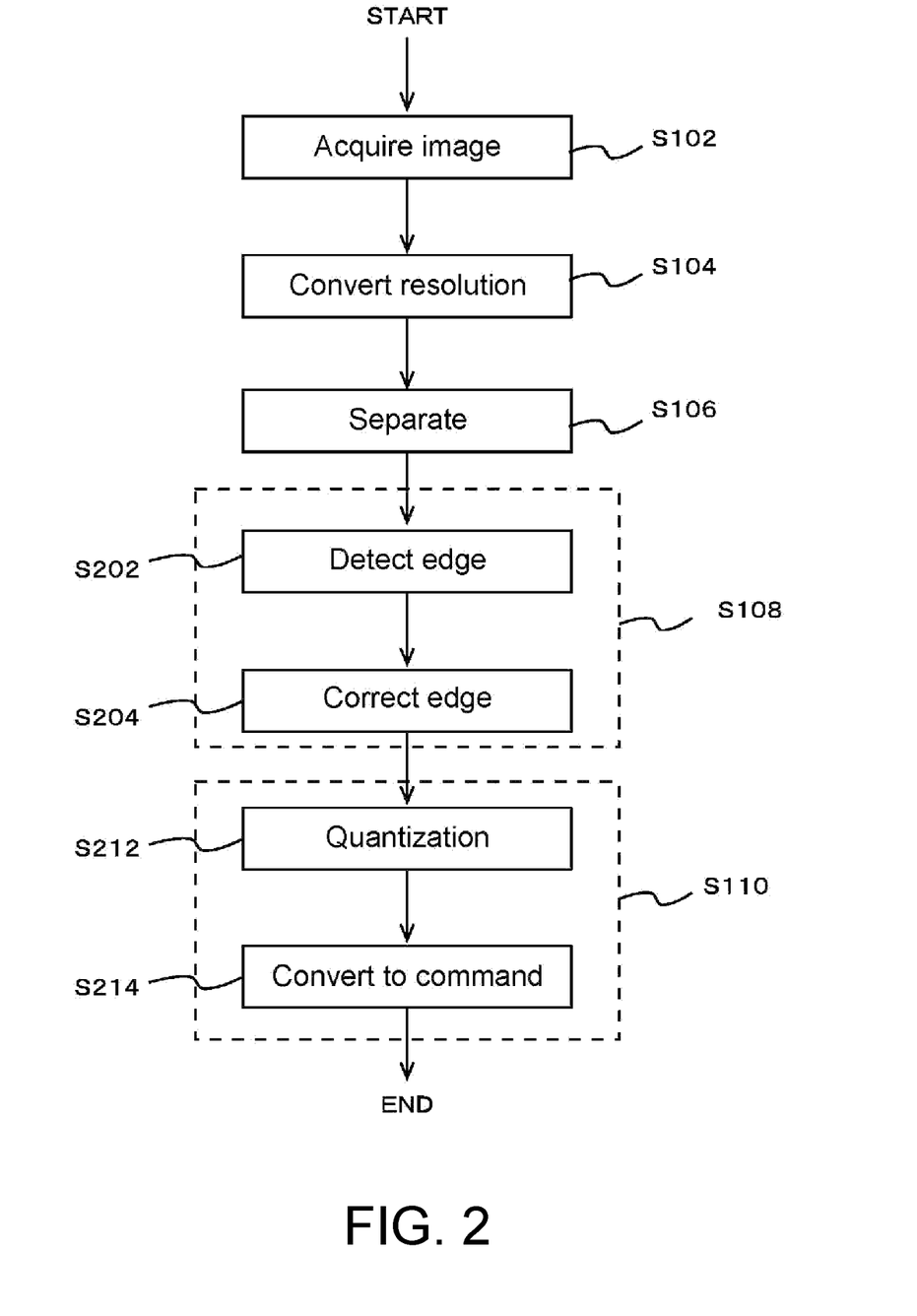
FIG. 2 is a flowchart showing an example of an operation of generating RIP generation data in an RIP processor 14.

FIG. 2 is a flowchart illustrating an example of an operation of generating RIP generation data in the RIP processor 14. In the operation of generating the RIP generation data, the RIP processor 14 first acquires input data indicating an image (print image) to be printed by the print executor 12 (S102). In the present example, the operation performed in step S102 is an example of an operation of an image acquisition process. In step S102, the RIP processor 14 acquires, as input data, color image data, which is data indicating a color image to be printed by the print executor 12. The process of acquiring color image data in step S102 can be performed in a manner same as or similar to the operation performed in the known RIP process.

Furthermore, in the present example, the RIP processor 14 converts the resolution for the color image data acquired in step S102 in accordance with the resolution of printing executed by the print executor 12 (S104). In this case, by converting the resolution in accordance with the resolution of printing, the pixels (pixel, pixel) configuring the image indicated by the color image data after the conversion can be associated with the ejection position where the print executor 12 ejects the ink from the inkjet head. The resolution conversion process performed in step S104 can also be performed in a manner same as or similar to the operation performed in the known RIP process.

Following the operation in step S104, the RIP processor 14 performs a separation process (S106). The separation process can be considered as a process of separating a color image indicating an image printed by the print executor 12 in accordance with the color of the ink used for printing. Furthermore, the separation process can be considered as a process of generating a gray-scaled image corresponding to each color of the inks of a plurality of colors used in the print executor 12, or the like. In the present example, the RIP processor 14 performs separation on the color image whose resolution has been converted in step S104 according to each color of the inks of a plurality of colors used at the time of executing printing in the print executor 12, thereby generating a gray-scaled image corresponding to each color. More specifically, in the present example, the RIP processor 14 generates a gray-scaled image corresponding to each color of Y, M, C, and K. The separation process can also be performed in a manner same as or similar to the operation performed in the known RIP process.

Furthermore, in the present example, the data indicating the gray-scaled image generated in step S106 corresponding to the ink of each color is an example of the processing target data. The processing target data can be considered as data or the like to be processed in the subsequently performed step S108. Furthermore, in the present example, the processing target data can also be considered as image data indicating an image to be printed by the print executor 12. Furthermore, the data indicating each gray-scaled image corresponding to the ink of each color can be considered as gradation image data or the like indicating the image to be printed with the ink of the corresponding color with a predetermined gradation. The gray-scaled image can also be considered as an image or the like expressed with three or more gradations. More specifically, in the present example, the RIP processor 14 generates a gray-scaled image of gradation of about 8 bits (e.g., 4 to 16 bits) in correspondence with the ink of each color.

Following the operation in step S106, the RIP processor 14 detects and corrects an edge in the image (S108). In this case, the edge can be considered as, for example, a boundary portion between the object and the background expressed in the image, a boundary portion continuous in the contour of the object, a series of pixels constituting the contour of the object, and the like. Furthermore, in the present example, the RIP processor 14 executes an edge detection process (S202) and an edge correction process (S204) as the operation in step S108. In this case, in step S202, the RIP processor 14 performs a process of detecting an edge with respect to at least a part of the image based on the data indicating the gray-scaled image generated in step S106. In step S204, the RIP processor 14 performs image processing of correcting the edge detected in step S202 on the image indicated by the gray-scaled image. The operation of detecting and correcting the edge performed in steps S202 and S204 will be described in more detail later.

Following the operation in step S108, the RIP processor 14 generates RIP generation data (S110). In this case, the RIP processor 14 generates the RIP generation data based on the gray-scaled image subjected to the edge correction in step S204 in step S108, thereby generating the RIP generation data reflecting the result of the image processing in the edge correction process. Furthermore, in this case, the process of generating the RIP generation data can be performed in a manner same as or similar to the operation performed in the known RIP process other than that the gray-scaled image subjected to the edge correction is used.

More specifically, in the present example, the RIP processor 14 performs a quantization process (S212) and a command process (S214) as the operations in step S110. In this case, in step S212, the RIP processor 14 performs a quantization process of reducing the number of gradations on each gray-scaled image corresponding to the ink of each color. The quantization process can be considered as an operation of reducing the gradation to the number of gradations expressible by the volume of droplets (ink droplets) that can be ejected in the inkjet head. The quantization process can also be considered as halftone process or the like performed according to the configuration of the inkjet head. As described above, the inkjet head in the print executor 12 of the present example is an inkjet head that ejects only the droplet of one type of volume. In this case, the quantization process can be considered as a process of binarizing an image, or the like. More specifically, the RIP processor 14 converts the gray-scaled image into a binary bitmap image by performing the quantization process. In this case, in the binary bitmap image generated by the quantization process, one value of the binary values can be considered to indicate the position where ink is ejected from the inkjet head among the ejection positions set according to the resolution of printing. The other value can be considered to indicate a position where ink is not ejected. The binary bitmap image can be considered as an image indicating a position where ink is ejected from the inkjet head, or the like.

As described above, in the modified example of the configuration of the print executor 12, for example, it is conceivable to use an inkjet head that ejects droplets of a plurality of types of volumes. In this case, the quantization process can be considered as processing of reducing the number of gradations of the image to the number of gradations according to the type of the volume of the droplet, or the like. Furthermore, in this case, it is conceivable to perform a process of binarizing the image for every volume of the droplets.

Furthermore, in step S214, the RIP processor 14 performs a command on the data indicating the binary bitmap image generated by the quantization process in step S212. In this case, the command can be considered as a process of converting into data in a format that can be processed by the print executor 12, or the like. In addition, the RIP processor 14 generates RIP generation data based on the data indicating the binary bitmap image generated by the quantization process by this command.

According to the present example, the RIP generation data can be appropriately generated based on the input data indicating the image to be printed by the print executor 12. Furthermore, in this case, the RIP generation data can be considered as data indicating a position where ink is ejected from the inkjet head among the ejection positions set according to the resolution of printing, or the like. Furthermore, as described above, according to the present example, the process of correcting the edge can be appropriately performed in the process of generating the RIP generation data. Furthermore, in the present example, the RIP processor 14 controls the operation of the print executor 12 by providing the RIP generation data to the print executor 12. Therefore, according to the present example, the print executor 12 can be caused to appropriately execute the printing operation reflecting the result of correcting the edge.

Note that, as described above, in the operation of generating the RIP generation data in the present example, operations other than the operation in step S108 can be performed in a manner same as or similar to the operation performed in the known RIP process. Furthermore, in the above description, for the sake of convenience of description, a part of a specific operation or the like performed to generate the RIP generation data will be appropriately omitted. Therefore, other than the operation described above, the RIP processor 14 may further perform an operation same as or similar to the operation performed in the known RIP process. For example, when the print executor 12 performs printing by the multi-pass method, it is conceivable that the RIP processor 14 performs a process of dividing data according to the operation by the multi-pass method.

Figure 3:
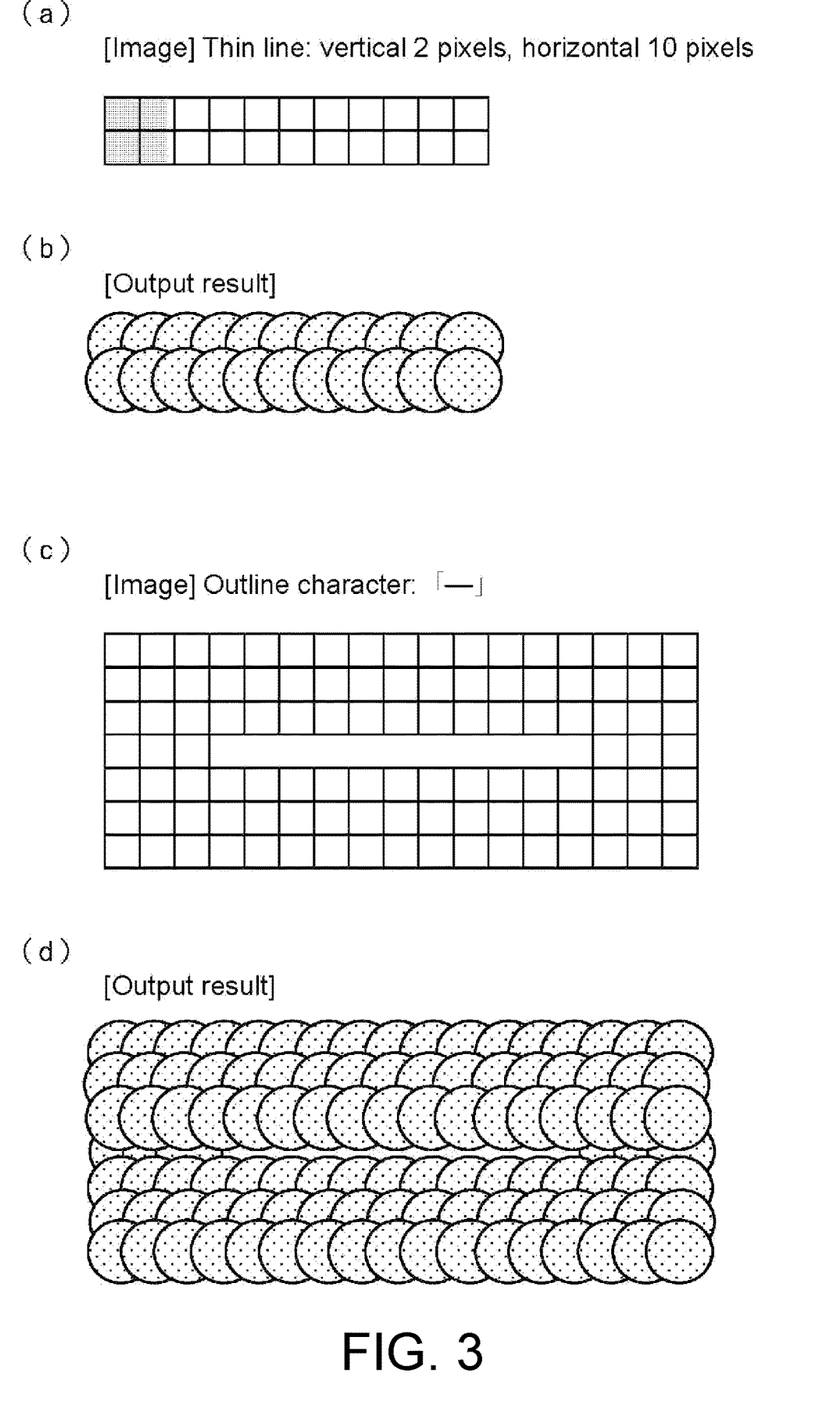

Next, the operation of detecting and correcting the edge performed in steps S202 and S204 will be described in more detail. First, an outline will be described for a reason for correcting an edge, an example of edge correction, and the like with reference to FIGS. 3 and 4. FIG. 3 is a diagram describing a reason for correcting an edge, and illustrates an example of a problem that occurs when edge correction is not performed.

(a) and (b) of FIG. 3 are diagrams illustrating examples of data indicating a thin line (line) and output results, and illustrate examples of an image on data and an output result in the print executor 12 for a thin line in which a width in the vertical direction is 2 pixels and a length in the horizontal direction is 10 pixels. (c) and (d) of FIG. 3 are diagrams illustrating examples of data indicating a thin outline character and output results, and illustrate examples of an image on data and an output result of the print executor 12 for a case where the character "-" is drawn so that the width in the vertical direction is 1 pixel and the length in the horizontal direction is 11 pixels. Furthermore, in the above, the image on the data can be considered as, for example, an image expressed in the RIP generation data. Furthermore, the output result in the print executor 12 can be considered as a line drawn on the medium by ink dots ejected from the inkjet head, or the like.

As described above, in the present example, the volume of the ink droplet ejected from each nozzle of the inkjet head is a volume in which the ink dot spreads in a range wider than a range of one dot determined according to the resolution of printing. More specifically, for example, when the resolution of printing is 600 dpi, the width for one pixel is about 42 lam. On the other hand, in the present example, the width of the range in which one dot spreads is larger than 42 lam. In this case, the width of the range in which one dot spreads can be considered as a width corresponding to the diameter when the shape of the ink dot is approximated by a circle, or the like. More specifically, in the present example, the width of the range in which one dot spreads is about 50 to 90 lam.

In this case, in the output result of the print executor 12, the ink dot formed at the position of each pixel is formed in a state of partially protruding to the position of the adjacent pixel. In addition, as a result, there is a case where the deviation of the state of the output result from the desired state corresponding to the image on the data becomes large. More specifically, for example, in the case of drawing a thin line as shown in (a) and (b) of FIG. 3, it is conceivable that a line thicker than an intended state (original state) is drawn due to protrusion of dots, or the color becomes darker due to an influence of overlapping of dots. Furthermore, for example, in the case of drawing an outline character as shown in (c) and (d) of FIG. 3, it is conceivable that a dot protrudes from a pixel in the vicinity of a portion where no ink dot is formed to represent the outline character. Furthermore, as a result, for example, it is conceivable that even a portion to be an outline character is filled, and the character cannot be read.

Figure 4:
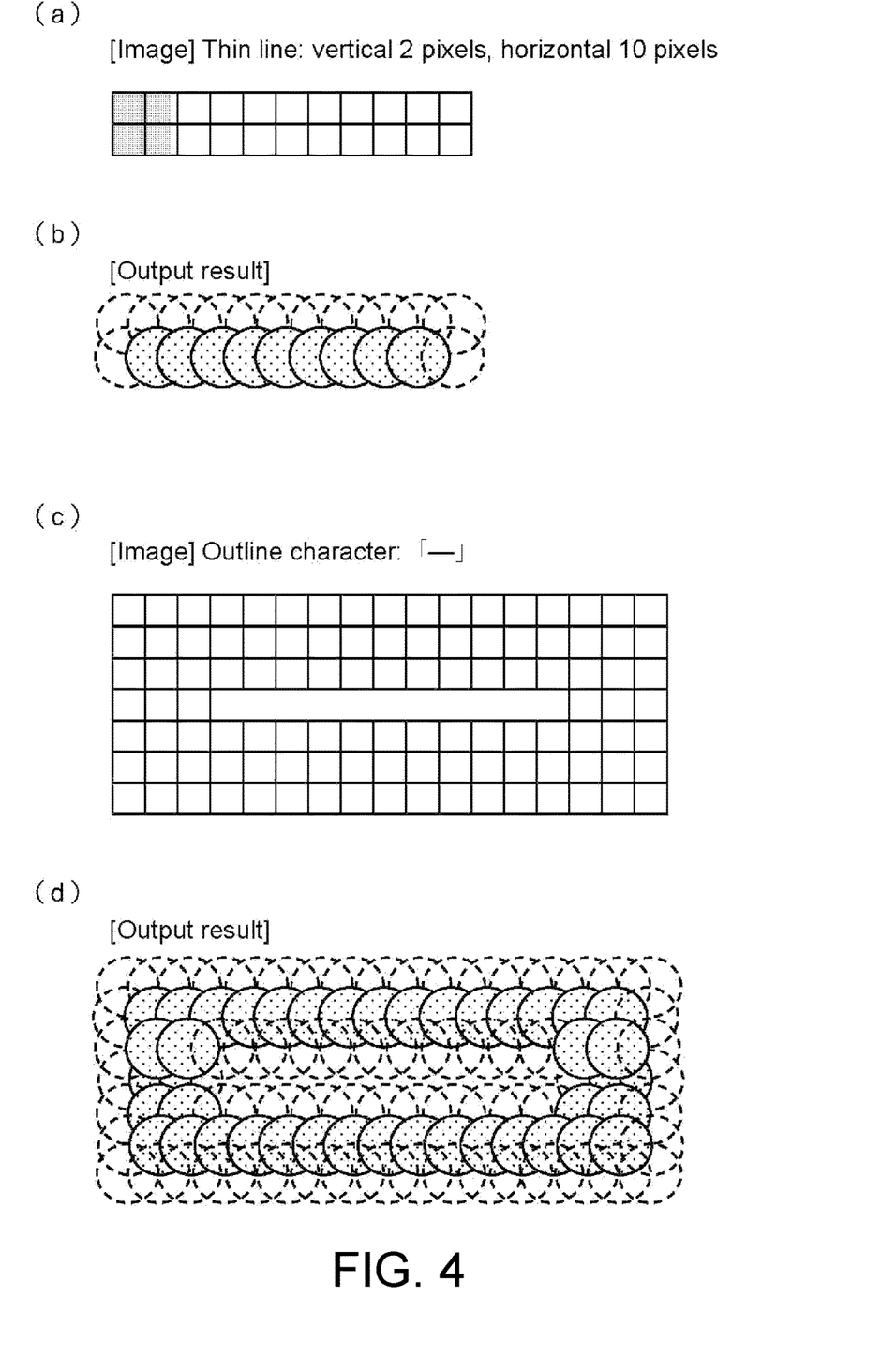
FIG. 4 is a diagram illustrating an example of edge correction performed in the present example. (a) and (b) of FIG. 4 illustrate examples of data indicating a thin line and output results. (c) and (d) of FIG. 4 illustrate examples of data indicating thin outline characters and output results.

On the other hand, in the present example, higher quality printing is enabled by performing edge correction. FIG. 4 is a diagram illustrating an example of edge correction performed in the present example. (a) and (b) of FIG. 4 are diagrams illustrating examples of data indicating thin lines (lines) and output results, and illustrate examples of an image on data and an output result of the print executor 12 for a case where the same thin line as in the case illustrated in (a) and (b) of FIG. 3 is drawn. (c) and (d) of FIG. 4 illustrate examples of an image on data and an output result of the print executor 12 for a case where the same outline character as that in the case illustrated in (c) and (d) of FIG. 3 is drawn. (a) and (c) of FIG. 4 illustrate an image corresponding to a state before correction in order to illustrate a desired image to be drawn. As a result, the images illustrated in (a) and (c) of FIG. 4 are the same as the images illustrated in (a) and (c) of FIG. 3. On the other hand, (b) and (d) of FIG. 4 illustrate the ink dot to be actually formed with a solid line circle and illustrate the ink dot not formed due to the correction with a broken line circle to indicate the result of the correction. More specifically, in (b) and (d) of FIG. 4, a broken line circle indicates an ink dot that is actually formed in the states of (b) and (d) of FIG. 3 and is not formed in the states of (b) and (d) of FIG. 4.

Furthermore, as can be understood from the comparison between (b) and (d) of FIG. 3 and (b) and (d) of FIG. 4, in the states of (b) and (d) of FIG. 4, the ink dot constituting the outer periphery in the states of (b) and (d) of FIG. 3 is eliminated (omitted) with respect to the region drawn by the arrangement of the ink dots to suppress the influence of the ink dot protruding to the position of the adjacent pixel. More specifically, in the case illustrated in (b) and (d) of FIG. 4, as compared with the case illustrated in (b) and (d) of FIG. 3, output is performed so as not to form a dot corresponding to one pixel at the position of the edge. With this configuration, in a case where a thin line is drawn, it is possible to appropriately prevent a line thicker than an intended state from being drawn, a color from becoming dark, and the like. In addition, in a case where an outline character is to be drawn, it is possible to appropriately prevent a situation where even a portion to be an outline character is filled and a character cannot be read.

Figure 5:
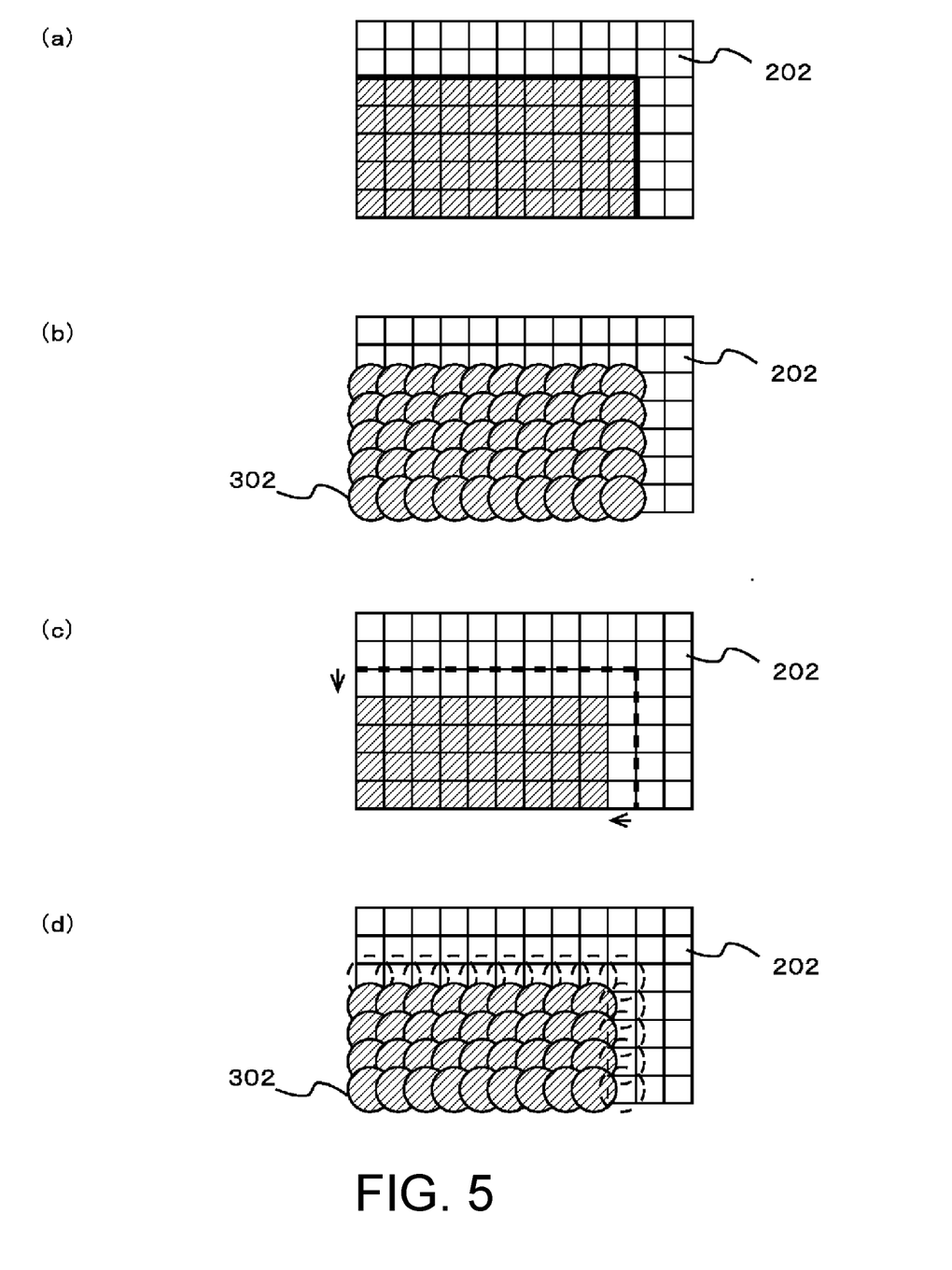
FIG. 5 is a diagram describing an operation of correcting an edge performed in the present example. (a) of FIG. 5 is a diagram describing an operation in an edge detection process. (b) of FIG. 5 illustrates an example of an output result when printing is performed without performing edge correction. (c) of FIG. 5 illustrates an example of an operation of an edge correction process. (d) of FIG. 5 illustrates an example of an output result of printing when edge correction is performed.

Furthermore, as can be understood from the above description and the like, in the present example, the ink dots are not formed for at least some ejection positions at the position of the edge by correcting the edge at the time of generating the RIP generation data. The operation of correcting an edge performed in the present example will be described in more detail below. FIG. 5 is a diagram describing an operation of correcting an edge performed in the present example. (a) of FIG. 5 is a diagram describing an operation in the edge detection process performed before the edge correction process.

As described above, in the present example, the RIP processor 14 performs a process of detecting an edge on at least a part of an image based on data indicating a gray-scaled image generated by the separation process. In this case, it is conceivable to perform edge detection and correction on the entire gray-scaled image indicated by the data. Furthermore, it is also conceivable to perform edge detection and correction on only a part of the gray-scaled image. In this case, it is conceivable to detect an edge in a preselected object using data in a format in which one part in the image is selectable as an object distinguished from other parts. Furthermore, such an operation can be considered as an operation or the like in which only some objects are targets of edge detection.

Furthermore, in the present example, the data indicating the gray-scaled image can be considered as data indicating an image configured by pixels associated with the ink ejection position in the print executor 12. In this case, one of the gradation values of the gray-scaled image is a non-ejection value that is a value indicating that the ink is not ejected to the corresponding ejection position. The other values are ejection values which are values other than the non-ejection value. More specifically, in this case, it is conceivable to use either the maximum value or the minimum value among the gradation values of the gray-scaled image as the non-ejection value. Furthermore, it is conceivable to use all values (a plurality of values) other than the non-ejection value among the gradation values as the ejection value. Then, in the present example, the RIP processor 14 detects an edge by detecting a position where a pixel where a non-ejection value is set and a pixel where an ejection value is set are adjacent to each other. In this case, the RIP processor 14 sequentially selects a pixel for each gray-scaled image corresponding to the ink of each color used in the print executor 12, and checks a pixel value of the pixel and surrounding pixel values to detect an edge.

Here, as described above, in the present example, the RIP processor 14 performs the quantization process on the gray-scaled image corresponding to the ink of each color to generate the binary bitmap image indicating the position where the ink is ejected from the inkjet head. In this case, the pixel value of the binary bitmap image corresponding to the pixel where the ejection value is set in the gray-scaled image may be a value indicating a position where ink is not ejected. Therefore, the ejection value and the non-ejection value in the gray-scaled image do not completely correspond to whether or not to eject ink at the time of actual printing, and can be considered as a value indicating a state at the time of the gray-scaled image, or the like.

Furthermore, (a) of FIG. 5 schematically illustrates an arrangement of a plurality of pixels 202 configuring a part of one gray-scaled image. In the figure, each square represents one pixel 202 corresponding to one ejection position set according to the resolution of printing. Among these pixels, the pixel 202 indicated by a shaded square is a pixel where the ejection value is set. The pixel indicated by a non-shaded square is a pixel where the non-ejection value is set. A thick line in the drawing indicates an edge detected in the illustrated case. According to the present example, the edge can be appropriately detected.

Furthermore, (a) of FIG. 5 can be considered to illustrate an image in a state where edge correction is not performed. Then, in this case, when the RIP generation data is generated without performing the edge correction and printing is executed in the print executor 12, as shown in (b) of FIG. 5, the ink dot protrudes to the position of the adjacent pixel 202, and the quality of printing may be degraded. (b) of FIG. 5 illustrates an example of an output result when printing is performed without performing edge correction.

On the other hand, in the present example, for example, as illustrated in (c) of FIG. 5, edge correction is performed. (c) of FIG. 5 illustrates an example of an operation of an edge correction process. In the present example, the RIP processor 14 performs image processing of correcting the edge by changing the pixel value of the corresponding pixel 202 to a non-ejection value for at least a part of the ejection position where the ink is ejected from the inkjet head to draw the edge detected in the edge detection process. In this case, this pixel value can be considered as the pixel value of the pixel 202 associated with the ejection position in the gray-scaled image. More specifically, in the case illustrated in (c) of FIG. 5, the RIP processor 14 corrects the edge by changing the pixel value of the pixel adjacent to the edge detected by the edge detection process to a non-ejection value.

Furthermore, in this case, the RIP processor 14 generates the RIP generation data based on the gray-scaled image after the correction. In this case, the output result of printing executed by the print executor 12 is as illustrated in (d) of FIG. 5. (d) of FIG. 5 illustrates an example of an output result of printing when edge correction is performed. As can be understood from the drawings, according to the present example, the ink dot can be appropriately prevented from spreading to the outer side of the position of the edge shown in (a) of FIG. 5. Furthermore, the influence of the dot gain can be appropriately suppressed, and the edge can be sharpened.

More specifically, in this case, for example, in the case of drawing a thin line, it is possible to appropriately prevent a line thicker than an intended state from being drawn, a color from becoming dark, and the like. In addition, for example, in a case where an outline character is to be drawn, it is possible to appropriately prevent a situation where even a portion to be an outline character is filled and a character cannot be read. Therefore, according to the present example, for example, the thinning of the line to draw, and the like can be appropriately realized, and high quality printing can be appropriately performed. Furthermore, in the present example, the edge correction can be appropriately performed for each color of the ink used in the print executor 12 by setting the data indicating the gray-scaled image generated in correspondence with the ink of each color in the separation process as the processing target data in the edge detection process and the edge correction process. Furthermore, the quality of the image to be printed can be more appropriately enhanced.

In FIG. 5, for the sake of convenience of illustration, the size of the ink dot in the output result is illustrated in consideration of making the relationship with the position of the pixel 202 easier to see than reflecting the actual size. Therefore, in (d) of FIG. 5, there is a possibility that the state after the correction does not necessarily look better than that before the correction. However, in the actual output result, printing in a state closer to the state indicated by the data before correction can be performed by correcting the edge as described above.

Furthermore, the operation of correcting the edge performed in the present example can be considered as an operation of omitting an ink dot corresponding to one pixel around the edge, or the like. Moreover, the operation of correcting the edge can also be considered as an operation of retracting the position of the edge, or the like. Furthermore, in the present example, the operation of correcting the edge can also be considered as an operation of adjusting the pixels indicating an image to be printed, or the like. Furthermore, the operation of the edge correction process performed in the present example can be considered as an example of an operation of setting the pixel value of the pixel within a range of a predetermined width from the edge to the non-ejection value, or the like. In addition, the operation of the RIP processor 14 in the edge correction process can also be considered as an operation of performing image processing of changing the pixel value of a pixel that is within a range of a predetermined number of pixels from the boundary of the edge to be corrected and in which the ejection value is set as the pixel value to a non-ejection value.

Furthermore, in the edge correction process, for example, if the edge is simply corrected for a thin line or the like, the line may disappear due to the correction. Therefore, in the present example, the RIP processor 14 further detects the width of the region to be corrected and corrects the edge according to the width, thereby correcting the edge so that the line does not disappear or the like due to the correction. More specifically, in the edge correction process, the RIP processor 14 performs image processing on the gray-scaled image for an edge generated in correspondence with a line having a preset line width or less among the edges detected in the edge detection process so that the line does not disappear due to edge correction. According to such a configuration, the edge can be more appropriately corrected. Examples of edge correction with respect to lines of various widths will be described more specifically below.

Figure 6:
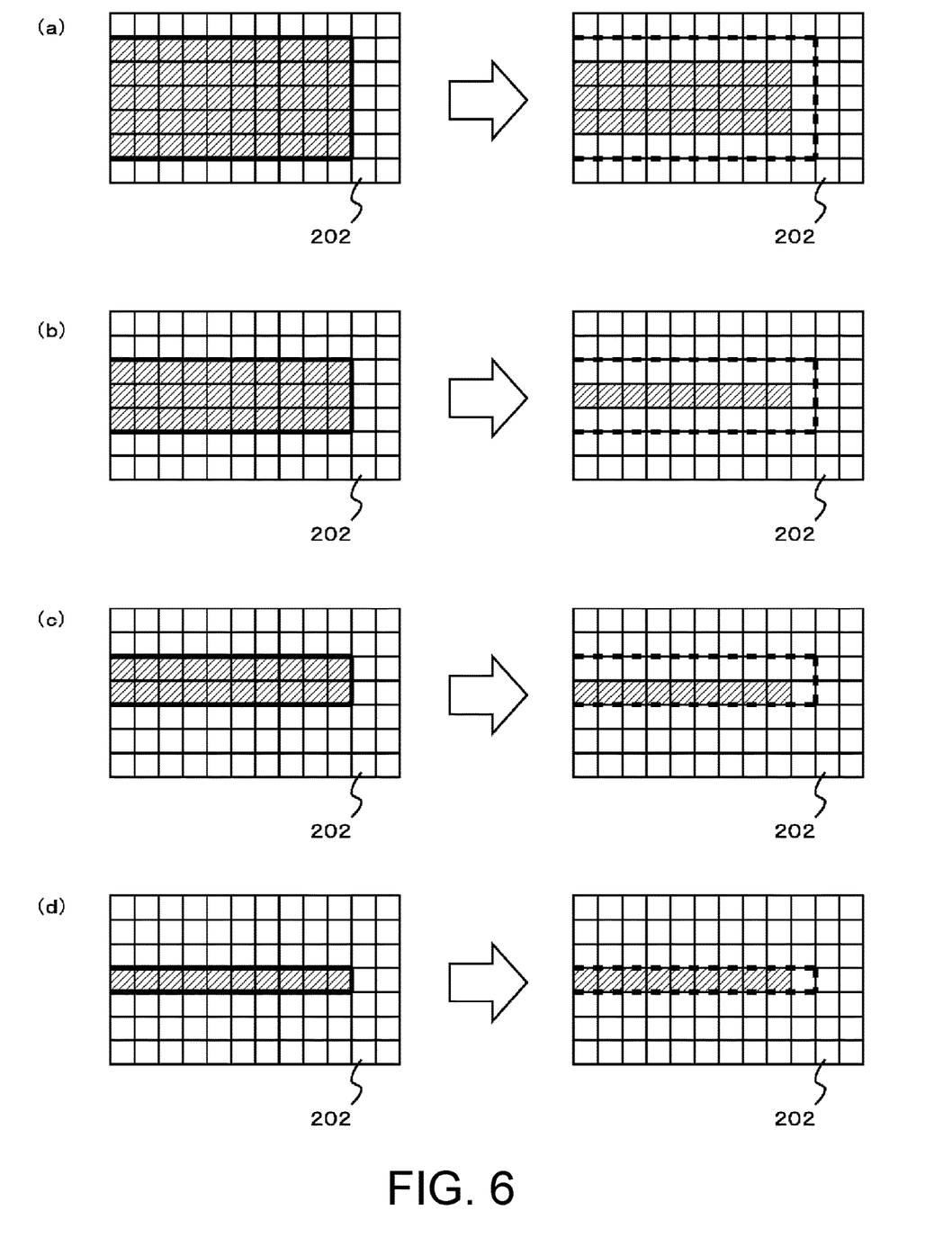
FIG. 6 is a diagram illustrating an example of edge correction. (a) to (d) of FIG. 6 illustrate examples of edge correction with respect to lines of various widths.

FIG. 6 illustrates an example of edge correction. (a) to (d) of FIG. 6 illustrate examples of edge correction with respect to lines of various widths. In (a) to (d) of FIG. 6, the left drawing illustrates some pixels of the gray-scaled image before the edge correction process is performed. The right diagram illustrates some pixels of the gray-scaled image after the edge correction process is performed. In the left drawing, a thick solid line indicates the position of the edge detected by the edge detection. In the right drawing, the thick broken line is drawn at the same position as the thick solid line in the right diagram.

More specifically, (a) of FIG. 6 is a diagram illustrating an example of edge correction performed on a wide line having a width corresponding to five pixels. In this case, the RIP processor 14 changes the pixel value to the non-ejection value for the region for one pixel along the edge by the operation of the edge correction process described above. Therefore, in the line after the edge correction process is performed, one pixel on one side and one pixel on the other side of the width corresponding to five pixels are reduced, and the line becomes a line having a width corresponding to three pixels as illustrated in the right diagram. Furthermore, in this case, one pixel at the distal end is also reduced in the length direction of the line. (b) of FIG. 6 is a diagram illustrating an example of edge correction performed on a line having a width corresponding to three pixels. In this case as well, in the edge correction process, the RIP processor 14 changes the pixel value to the non-ejection value for the region corresponding to one pixel along the edge. Therefore, in the line after the edge correction process is performed, one pixel on one side and one pixel on the other side of the width corresponding to three pixels are reduced, and the line becomes a line having a width corresponding to one pixel as illustrated in the right diagram. Furthermore, in this case as well, one pixel at the distal end is also reduced in the length direction of the line.

Furthermore, as can be understood from the above description and the like, the RIP processor 14 reduces the width of a line having a thicker width or a region having a thicker width by performing edge correction in the same manner as described above. However, if edge correction similar to the above is performed on a line having a narrower width or the like, the line may disappear due to the correction. More specifically, for example, when the edge correction process is performed on a line having a width corresponding to less than or equal to two pixels in the same manner as in the cases shown in (a) and (b) of FIG. 6, the pixel values of the pixels corresponding to the entire width are changed to non-ejection values, so that the line disappears.

Therefore, as described above, in the present example, the RIP processor 14 performs image processing on a gray-scaled image for an edge generated in correspondence with a line having a preset line width or less so that the line does not disappear due to edge correction. In this case, performing image processing so that the line does not disappear can be considered as performing image processing so that at least one pixel remains in the width direction, or the like. Furthermore, remaining pixels can be considered as remaining pixels whose pixel values are ejection values, or the like. More specifically, in the present example, as illustrated in (c) and (d) of FIG. 6, the operation of the edge correction process performed on a line or a region having a width corresponding to two or less pixels is different from the operation of the edge correction process performed on a line or a region having a width corresponding to three or more pixels.

(c) of FIG. 6 is a diagram illustrating an example of edge correction performed on a line having a width corresponding to two pixels. In this case, in the edge correction process, the RIP processor 14 changes the pixel value to a non-ejection value for a region corresponding to one pixel along the edge on one side in the width direction with respect to the width direction of the line. Therefore, only one pixel on one side of the width corresponding to two pixels is reduced in the line after the edge correction process is performed, and the line becomes a line having a width corresponding to one pixel as illustrated in the right diagram. Furthermore, in this case as well, one pixel at the distal end is also reduced in the length direction of the line. (d) of FIG. 6 is a diagram illustrating an example of edge correction performed on a line having a width corresponding to one pixel. In this case, in the edge correction process, the RIP processor 14 does not perform correction with respect to the width direction of the line. Therefore, the line after the edge correction process is performed becomes a line having a width corresponding to one pixel as illustrated in the right diagram. Furthermore, in this case as well, one pixel at the distal end is also reduced in the length direction of the line. According to the present example, the edge correction process can be more appropriately performed even when printing of an image including a thin line is performed. Furthermore, the quality of the image to be printed can be more appropriately enhanced.

Figure 8:
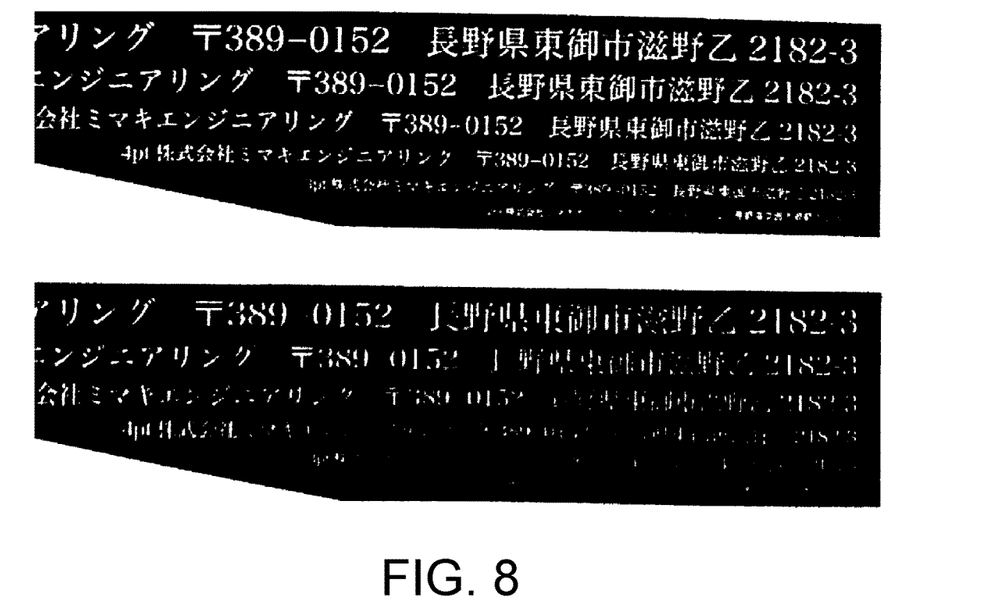
FIG. 8 is a diagram describing an effect of the edge correction process.

Next, supplementary description regarding each configuration described above, description on a modified example, and the like will be made. The inventor of the present application confirmed the effect of the edge correction process by actually performing the edge correction process described above to print various images. FIG. 8 is a view describing an effect of the edge correction process, and illustrates a comparison between a result of performing printing by performing the edge correction process and a result of performing printing without performing the edge correction process for a case of printing an image including outline characters of various sizes. In the figure, the photograph on the upper side shows the printing result when the edge correction process is performed by the method described above. This printing result can be considered to indicate a result of performing thinning for one pixel. The photograph on the lower side shows the printing result when printing is performed without performing the edge correction process. According to these comparisons, it can be specifically confirmed that printing with higher quality becomes possible by performing the edge correction process. Although illustration is omitted, the inventor of the present application confirmed that the quality of printing can be appropriately enhanced by the edge correction process by actually performing printing of various images such as, for example, an image including a thin line and the like in addition to the example illustrated in FIG. 8.

Figure 7:
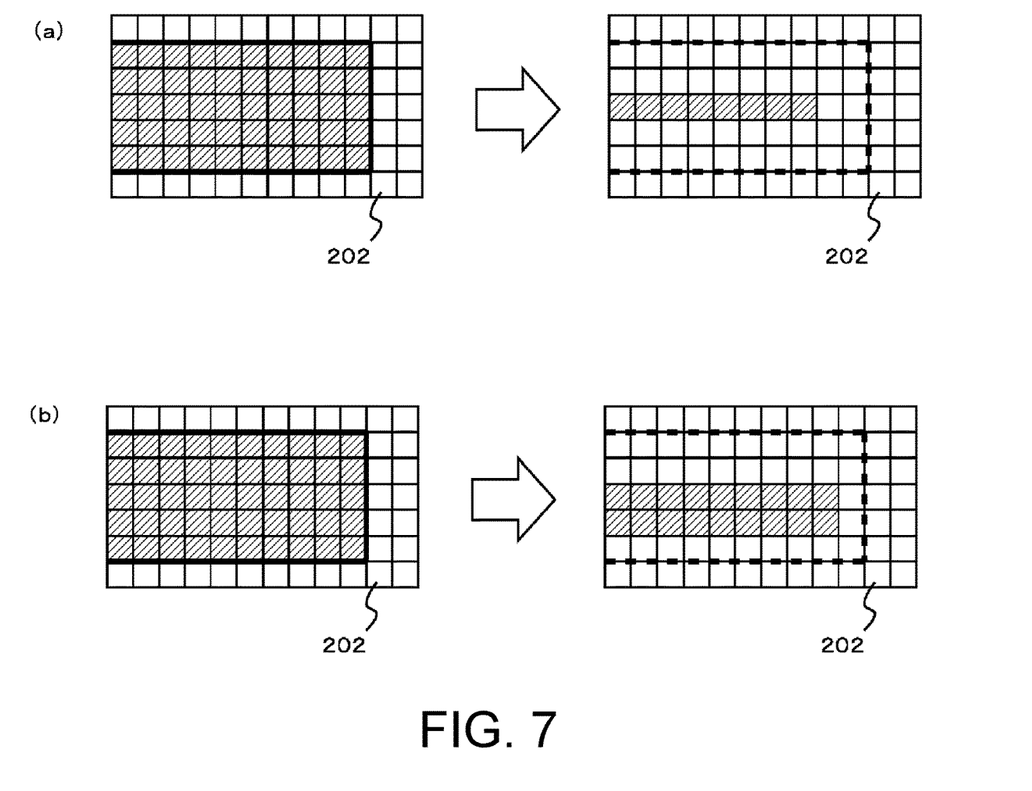
FIG. 7 is a diagram describing a modified example of the edge correction process. (a) and (b) of FIG. 7 illustrate an example of a range in which a pixel value is changed in a modified example of the edge correction process.

Furthermore, as can be understood from the above description and the like, the specific operation of the edge correction process is not limited to the operation described above, and various changes can be made. FIG. 7 is a diagram describing a modified example of the edge correction process. (a) and (b) of FIG. 7 illustrate an example of a range in which a pixel value is changed in a modified example of the edge correction process. In the above description, regarding the edge correction process, an example of when changing the pixel value for one pixel along the edge to the non-ejection value has been mainly described. However, the range in which the pixel value is changed in the edge correction process is not limited to the example described above, and various changes can be made. For example, in the edge correction process, the RIP processor 14 may change the pixel value of the pixel in the range to a non-ejection value for a range (e.g., a range of about two to three pixels) having a width corresponding to two or more pixels along the edge. More specifically, for example, (a) of FIG. 7 illustrates an example of a range in which the pixel value is changed by the edge correction process for a case where the pixel value for two pixels along the edge is changed to the non-ejection value. Furthermore, consideration is made to determine the width of changing the pixel value in the edge correction process based on, for example, the relationship between the size of the ink dot actually formed at the time of printing and the resolution. According to such configuration, for example, the edge correction can be appropriately performed according to the size of the ink dot and the resolution.

Furthermore, the width of the range in which the pixel value is changed in the edge correction process may be, for example, different between the edge on one side and the edge on the other side of the line or the region. More specifically, for example, (b) of FIG. 7 shows an example of a case in which the pixel values of two pixels along the edge are changed to non-ejection values on one side of the line, and the pixel value of one pixel along the edge is changed to a non-ejection value on the other side of the line and the other parts. Even in such a configuration, the edge correction can be appropriately performed.

Furthermore, in the above description, regarding the edge correction process, the operation for a case in which the pixel values of all the pixels within the range of the predetermined width along the edge are changed to the non-ejection values has been mainly described. Such an operation can be considered as an operation of deleting all dots within a range of a predetermined width from the edge, or the like. Furthermore, depending on the quality required for printing and the like, it is conceivable to select some pixels from among the pixels within a range of a predetermined width along the edge and change the pixel value to a non-ejection value only for the pixel value of the selected pixel.

Furthermore, as described above, in the edge detection process, it is also conceivable to detect an edge in a preselected object. In this case, in the edge correction process, it is conceivable to perform the edge correction only for the edge detected in the selected object. In the case of such a configuration, the edge correction meeting the intention of the user can be more appropriately performed by selecting the portion requiring the correction. Furthermore, in this case, for example, it is conceivable to select an object corresponding to a portion where it is important to express a thin line, such as a portion expressing a character, and perform edge detection and correction.

Furthermore, in this case, it is conceivable to further use an auxiliary image to be used for selecting an object to select an object, in addition to the plurality of gray-scaled images generated by the separation process in correspondence with the inks of the plurality of colors used in the print executor 12. In this case, the auxiliary image can be considered as, for example, an image including pixels in which auxiliary values to be used for selecting an object are set, or the like. More specifically, in this case, the RIP processor 14 determines the object to be selected based on the data indicating the gray-scaled image corresponding to the ink used in the print executor 12 and the auxiliary data indicating the auxiliary image. Furthermore, in this case, the gray-scaled image corresponding to the ink used in the print executor 12 can be considered as an image in which a color expression value, which is a value set to represent a color for each pixel, is set, or the like. Furthermore, the auxiliary image can be considered as an image in which an auxiliary value, which is a target value different from the color expression value, is set for each pixel, or the like. Furthermore, in this case, the RIP processor 14 treats a portion including pixels corresponding to pixels to which a predetermined auxiliary value is set in the auxiliary image among the pixels of the gray-scaled image corresponding to the ink used in the print executor 12 as an object to be detected, and detects an edge in the object. With this configuration, the object can be easily and appropriately selected.

Furthermore, as can be understood from the above description and the like, the auxiliary data can be considered as, for example, data indicating an image in which the auxiliary value is set for the pixel, or the like. As such auxiliary data, for example, it is conceivable to use a channel (alpha channel etc.) prepared separately from a color channel in data indicating a color image using a plurality of color channels corresponding to a plurality of colors. More specifically, in this case, in the separation process, the print executor 12 generates a plurality of gray-scaled images each corresponding to the ink of each color used in the print executor 12 and auxiliary data associated with these gray-scaled images based on the color image data including the channel corresponding to such auxiliary data. More specifically, in this case, in the separation process, the RIP processor 14 generates data of an image including a plurality of color channels corresponding to the plurality of gray-scaled images and a channel indicating the auxiliary data. Then, in the edge detection process, the RIP processor 14 identifies the selected object based on the plurality of gray-scaled images and the auxiliary data. Then, an edge detection is performed on the selected object. With this configuration, the edge included in a part of the image can be appropriately detected.

Furthermore, it is also conceivable to select an object by a method different from the above. For example, it is also conceivable to select an object according to a user's instruction received using an input device such as a mouse. In this case, it is conceivable that the RIP processor 14 further performs a range selecting process of receiving, from the user, an instruction to select a partial range in an image for an image such as a gray-scaled image generated by the separation process. In the range selecting process, for example, an instruction to select a partial range in the image may be received from the user for another image associated with the gray-scaled image. Furthermore, in the edge detection process, a part including pixels in the range selected by the user in the range selecting process among the pixels of the gray-scaled image to be processed is treated as an object distinguished from other parts in the image, and an edge in the object is detected. With this configuration as well, the object can be easily and appropriately selected.

Furthermore, as described above, in the present example, the RIP processor 14 performs the edge detection process and the edge correction process on the gray-scaled image corresponding to the ink of each color used in the print executor 12. In this regard, in a case where only the edge correction is considered, in principle, for example, it is also conceivable to perform edge detection and correction on a color image before the separation process is performed or a binary bitmap image generated by the quantization process. However, in a case where the edge detection and the correction are performed on the color image, for example, it is necessary to separately calculate the ejection amount or the like of the ink of each color to the position of the pixel and determine the correction amount, and the correction process may become complicated. Furthermore, in a case where the edge detection and correction are performed on the binary bitmap image, the ejection position to where the ink is ejected is discretely set by the quantization process, and thus the edge may be difficult to detect. On the other hand, when the edge detection process and the edge correction process are performed on the gray-scaled image corresponding to the ink of each color, the edge detection and correction can be more appropriately performed without causing such a problem.

Furthermore, in this case, it is conceivable to perform the edge detection process and the edge correction process on the gray-scaled image corresponding to the ink of all the colors used in the print executor 12. More specifically, as described above, when the ink of each color of Y, M, C, and K is used in the print executor 12, it is conceivable to perform the edge detection process and the edge correction process on the gray-scaled image for these four colors. According to such configuration, the quality of printing can be more appropriately enhanced. Furthermore, in a case where ink other than each color of Y, M, C, and K (e.g., special color ink) is further used in the print executor 12, it is conceivable to further use a gray-scaled image corresponding to the color and perform the edge detection process and the edge correction process on the gray-scaled image at the time of generating the RIP generation data.

Furthermore, in a modified example of the operation of generating the RIP generation data, for example, it is also conceivable to perform the edge detection process and the edge correction process on only the colors of some inks among the inks of each color used in the print executor 12. In this case, it is preferable to perform the edge detection process and the edge correction process at least for a color in which the edge is easily noticeable, such as, for example, ink of K color (black color). In this case, it is more preferable to perform the edge detection process and the edge correction process not only for the K color but also for any color other than the K color.

Furthermore, as described above, for example, a computer or the like that executes a program for RIP process can be suitably used as the RIP processor 14. In this case, this program can be considered as an example of a program for generating the ejection position data. Furthermore, it can be considered that the RIP processor 14 operates as an ejection data generation device according to a program. Moreover, in this case, each unit of the RIP processor 14 can be considered to function as each unit of the ejection data generation device.

Furthermore, in this case, each unit (e.g., a CPU etc.) of the computer used as the RIP processor 14 can be considered to function as a processor that performs each process described with reference to FIG. 2 and the like. Furthermore, the RIP processor 14 can also be considered to include such a processor. More specifically, in this case, the RIP processor 14 can be considered to include an image acquisition processor, a resolution conversion processor, a separation processor, an edge detection processor, an edge correction processor, an RIP generation data generator, and the like. In this case, the RIP generation data generator can be considered as an example of the ejection position data generation processor. Furthermore, the RIP generation data generator can be considered to include a quantization processor and a command processor.

Furthermore, in the above description, regarding the operation of the edge correction process, the operation of changing the pixel value of at least some pixels in the predetermined range along the edge to the non-ejection value has been mainly described. In the operation of such edge correction process, it is also conceivable that the image processing of correcting the edge is performed so that the ink ejected to at least a part of the ejection position, to where the ink is ejected from the inkjet head to draw the edge detected in the edge detection process, is reduced. As such edge correction process, it is also conceivable to perform edge correction process by a method further different from the method described above.

More specifically, as described above, in the modified example of the configuration of the print executor 12, it is also considered to use an inkjet head that ejects droplets of a plurality of types of volumes as the inkjet head for the ink of each color. In this case, it is also conceivable to perform the edge correction process so that the volume of ink droplets ejected to at least some ejection positions in the vicinity of the edge becomes small. Furthermore, in this case, it is conceivable to perform the edge correction process on the gray-scaled image generated by the separation process by changing the gradation value to the ejection value closer to the non-ejection value instead of changing the ejection value to the non-ejection value for the pixel value of the pixel in the predetermined range along the edge detected by the edge detection process. In this case, the ejection value in which the gradation value is closer to the non-ejection value can be considered as a gradation value closer to the value used as the non-ejection value among the gradation values set for each pixel of the gray-scaled image. Furthermore, the operation of such edge correction process can be considered as a correction process of reducing the size of the ink dot formed at at least some ejection positions in the vicinity of the edge, and the like. Even with such a configuration, the quality of printing executed in the print executor 12 can be appropriately enhanced.

INDUSTRIAL APPLICABILITY

The present invention can be suitably used in a method for generating ejection position data.

The invention claimed is:

1. A method for generating ejection position data for generating ejection position data that is data indicating an ejection position where ink is ejected from an inkjet head in a printing apparatus, the method comprising:
an edge detection process of detecting an edge with respect to at least a part of an image based on processing target data that is image data indicating the image to be printed by the printing apparatus;
an edge correction process of performing image processing of correcting the edge detected in the edge detection process on the image; and
an ejection position data generation process of generating the ejection position data by reflecting a result of the image processing in the edge correction process; wherein
the processing target data is data indicating the image configured by pixels associated with the ejection position, and in which a non-ejection value that is a value indicating that ink is not ejected to the corresponding ejection position or an ejection value that is a value other than the non-ejection value is set as a pixel value of each pixel;
in the edge detection process, the edge is detected by detecting a position where a pixel to which the non-ejection value is set and a pixel to which the ejection value is set are adjacent to each other; and
in the edge correction process, the image processing of correcting the edge by changing the pixel value of the corresponding pixel to the non-ejection value is performed for at least a part of the ejection position where ink is ejected from the inkjet head to draw the edge detected in the edge detection process.

2. The method for generating the ejection position data as set forth in claim 1, wherein in the edge correction process, the image processing of changing the pixel value of a pixel that is within a range of a predetermined number of pixels from a boundary of the edge to be corrected and to which the ejection value is set as the pixel value to the non-ejection value is performed.

3. The method for generating the ejection position data as set forth in claim 1, wherein in the edge correction process, the image processing on the image is performed so that a line does not disappear due to the edge correction for the edge generated in correspondence with the line having a preset line width or less among the edges detected in the edge detection process.

4. The method for generating the ejection position data as set forth in claim 1, wherein
the printing apparatus is a color printer that performs color printing using inks of a plurality of colors;
an image acquisition process of acquiring color image data that is data indicating a color image to be printed by the printing apparatus, and
a separation process of generating a gray-scaled image corresponding to each color of the inks of the plurality of colors used in the printing apparatus, the separation process separating the color image according to each color of the inks of the plurality of colors to generate a gray-scaled image corresponding to each color are further performed; and
data indicating a gray-scaled image corresponding to each color is used as the processing target data.

5. The method for generating the ejection position data as set forth in claim 1, wherein
the processing target data is data in a format in which one part in the image is selectable as an object distinguished from other parts; and
in the edge detection process, the edge in the object selected in advance is detected.

6. The method for generating the ejection position data as set forth in claim 5, wherein
in the edge detection process,
auxiliary data indicating an auxiliary image that is an image in which an auxiliary value that is a value of different object from a value set to express a color is an image set for each pixel; and
a portion including a pixel corresponding to a pixel to which a predetermined auxiliary value is set in the auxiliary image among pixels of the image indicated by the processing target data is treated as the object to be detected, and the edge in the object is detected.

7. The method for generating the ejection position data as set forth in claim 1, wherein a range selecting process of receiving an instruction to select a partial range in the image from a user is further performed; and
in the edge detection process, a part including a pixel in the range selected by the user in the range selecting process among the pixels of the image indicated by the processing target data is treated as an object distinguished from other parts in the image, and the edge in the object is detected.

8. An ejection position data generation device for generating ejection position data that is data indicating an ejection position where ink is ejected from an inkjet head in a printing apparatus, the method comprising:
   an edge detection processor that detects an edge with respect to at least a part of the image based on processing target data that is image data indicating an image to be printed by the printing apparatus;
   an edge correction processor of performing image processing of correcting the edge detected in the edge detection processor on the image; and
   an ejection position data generation processor of generating the ejection position data by reflecting a result of the image processing in the edge correction processor; wherein
   the processing target data is data indicating the image configured by pixels associated with the ejection position, and in which a non-ejection value that is a value indicating that ink is not ejected to the corresponding ejection position or an ejection value that is a value other than the non-ejection value is set as a pixel value of each pixel;
   the edge detection processor detects the edge by detecting a position where a pixel to which the non-ejection value is set and a pixel to which the ejection value is set are adjacent to each other; and
   the edge correction processor performs the image processing of correcting the edge by changing the pixel value of the corresponding pixel to the non-ejection value for at least a part of the ejection position where ink is ejected from the inkjet head to draw the edge detected in the edge detection processor.

9. A method for generating ejection position data for generating ejection position data that is data indicating an ejection position where ink is ejected from an inkjet head in a printing apparatus that performs color printing using inks of a plurality of colors, the method comprising:
   an image acquisition process of acquiring color image data that is data indicating a color image to be printed by the printing apparatus;
   a separation process of generating a gray-scaled image corresponding to each color of the inks of the plurality of colors used in the printing apparatus, the separation process separating the color image according to each color of the inks of the plurality of colors to generate a gray-scaled image corresponding to each color;
   an edge detection process of detecting an edge with respect to at least a part of a gray-scaled image based on processing target data that is image data indicating the gray-scaled image corresponding to each color;
   an edge correction process of performing image processing of correcting the edge detected in the edge detection process on the gray-scaled image; and
   an ejection position data generation process of generating the ejection position data by reflecting a result of the image processing in the edge correction process; wherein
   the processing target data is data indicating the gray-scaled image configured by pixels associated with the ejection position, and in which a non-ejection value that is a value indicating that ink is not ejected to the corresponding ejection position or an ejection value that is a value other than the non-ejection value is set as a pixel value of each pixel;
   in the edge detection process, the edge is detected by detecting a position where a pixel to which the non-ejection value is set and a pixel to which the ejection value is set are adjacent to each other; and
   in the edge correction process, the image processing of correcting the edge is performed to reduce ink to be ejected to at least a part of the ejection position where ink is ejected from the inkjet head to draw the edge detected in the edge detection process.

* * * * *